United States Patent [19]
Suzuki et al.

[11] Patent Number: 6,133,358
[45] Date of Patent: Oct. 17, 2000

[54] FLAME-RETARDANT RESIN COMPOSITION

[75] Inventors: Mioko Suzuki, Chiba; Noritsugu Saiki, Hino, both of Japan

[73] Assignee: Teijin Ltd., Japan

[21] Appl. No.: 09/142,638

[22] PCT Filed: Jan. 6, 1998

[86] PCT No.: PCT/JP98/00013

§ 371 Date: Sep. 10, 1998

§ 102(e) Date: Sep. 10, 1998

[87] PCT Pub. No.: WO98/30632

PCT Pub. Date: Jul. 16, 1998

[30] Foreign Application Priority Data

Jan. 10, 1997 [JP] Japan .................. 9-003021

[51] Int. Cl.⁷ .............. C08K 3/32; C09K 21/00
[52] U.S. Cl. ............ 524/414; 524/417; 523/204; 523/207
[58] Field of Search .................. 524/414, 417; 523/204, 207

[56] References Cited

U.S. PATENT DOCUMENTS

| | | | |
|---|---|---|---|
| 4,188,313 | 2/1980 | Cerny et al. | 260/37 |
| 4,242,240 | 12/1980 | Cerny et al. | 260/14 |
| 4,493,913 | 1/1985 | Hirobe et al. | 523/205 |
| 4,879,067 | 11/1989 | Sakon et al. | 252/609 |
| 5,026,757 | 6/1991 | Sakon et al. | 524/414 |
| 5,626,757 | 5/1997 | Armstrong | 210/635 |

FOREIGN PATENT DOCUMENTS

| | | |
|---|---|---|
| 92776 | 11/1983 | European Pat. Off. . |
| 58-8062 | 1/1970 | Japan . |
| 45-37125 | 11/1970 | Japan . |
| 52-112651 | 9/1977 | Japan . |
| 53-94357 | 8/1978 | Japan . |
| 54-39200 | 11/1979 | Japan . |
| 58-108248 | 6/1983 | Japan . |
| 58-196259 | 11/1983 | Japan . |
| 58-198559 | 11/1983 | Japan . |
| 59-8736 | 1/1984 | Japan . |
| 59-24752 | 2/1984 | Japan . |
| 59-81351 | 5/1984 | Japan . |
| 61-111342 | 5/1986 | Japan . |
| 63-110254 | 5/1988 | Japan . |
| 63-156860 | 6/1988 | Japan . |
| 2-37370 | 8/1990 | Japan . |
| 7-126498 | 5/1995 | Japan . |
| 7-278267 | 10/1995 | Japan . |
| 8-188717 | 7/1996 | Japan . |
| 8-208884 | 8/1996 | Japan . |
| 1141213 | 5/1967 | United Kingdom . |

OTHER PUBLICATIONS

Journal of Fire Retardant Chemistry, vol. 7, pp. 69–76, 1980.

*Primary Examiner*—James J. Seidleck
*Assistant Examiner*—Olga Asinovsky
*Attorney, Agent, or Firm*—Rader, Fishman & Grauer

[57] ABSTRACT

A non-halogen flame retardant polyester resin composition shows high flame retardancy with a small amount of a flame retardant, provides a molded product not causing dripping at the time of combustion, is excellent in mechanical strength and resin knead-processability, and is free from bleed-out by annealing, wherein the resin composition comprises 100 parts by weight of a polyester such as polytetramethylene terephthalate, 1 to 15 parts by weight of coated red phosphorus powder and 3 to 70 parts by weight of a novolak phenol resin.

9 Claims, No Drawings

FLAME-RETARDANT RESIN COMPOSITION

TECHNICAL FIELD

This invention relates to a flame retardant resin composition. More specifically, it relates to a non-halogen flame retardant resin composition which has high flame retardancy, does not cause dripping of a molten resin when it burns and has no bleed-out caused by annealing on the surface of a molded product, and is satisfactory in terms of mechanical strength and resin knead-processability.

BACKGROUND TECHNOLOGY

Since polyester resins including polybutylene terephthalate have excellent mechanical properties, heat resistance, chemical resistance and the like, they are widely used as a molded product for application in electric and electronic fields, automobile field and the like.

Many of these applications require flame retardancy, and resins are available that are provided with flame retardancy by using mainly a halogen compound and an antimony compound as a flame retardant or a flame retardant aid.

However, the decomposed product of a halogen flame retardant may corrode a metal which forms an electric part, and some halogen flame retardants have a problem with the influence on environment. Therefore, non-halogen flame retardant resins are desired.

The non-halogen flame retardants include phosphorus compounds, for example. As typical organic phosphorus compounds, low-molecular-weight phosphates such as triphenyl phosphate (TPP) have been frequently used. However, a polyester resin such as polybutylene terephthalate has relatively high processing temperature, and encounters problems in bleedout and heat resistance when a low-molecular-weight phosphate is used.

JP-A 7-126498 discloses a non-halogen flame retardant for a polyester resin, which is prepared by melt-reacting a polyester resin, an epoxy compound having at least two epoxy groups in the molecule, a phenol resin and/or at least one non-halogen flame retardant compound selected from phosphorus, nitrogen and boron compounds having a functional group capable of reacting with an epoxy group.

JP-A 7-278267 discloses a flame-retardant polyester resin composition comprising 5 to 50 parts by weight of the above non-halogen flame retardant and 100 parts by weight of a polyester resin.

The above non-halogen flame retardant has a characteristic feature in that it comprises an epoxy compound having at least two epoxy groups in the molecule.

JP-A 8-188717 discloses a flame retardant resin composition comprising a thermoplastic resin such as polystyrene or polyester, a phosphorus compound such as a phosphate or phosphite, and a phenol aralkyl resin such as a reaction product between a phenol (such as cresol) and an aralkyl halide (such as α,α-dichloro-p-xylene).

JP-A 8-208884 discloses a flame retardant resin composition comprising a thermoplastic resin such as polystyrene or polyester, a phosphorus compound such as a phosphate or phosphite, and a phenol resin derived from a phenol substituted at the ortho- or para-position.

Meanwhile, Journal of Fire Retardant Chemistry vol. 7, pp. 69–76, 1980 discloses that polystyrene can be made flame-retardant by red phosphorus and a phenol resin.

JP-A 2-37370 discloses a flame retardant polyester resin composition comprising 99 to 34 parts by weight of a thermoplastic polyester resin having a softening point of 150° C. or higher such as polyethylene terephthalate, 1 to 25 parts by weight of red phosphorus coated with a thermosetting resin, and 10 to 55 parts by weight of a reinforcing filler.

DISCLOSURE OF THE INVENTION

It is therefore an object of the present invention to provide a flame retardant resin composition having novel composition.

It is another object of the present invention to provide a flame retardant resin composition which shows high flame retardancy with a smaller amount of a non-halogen flame retardant and provides a molded product which does not drip in the state of a molten resin during combustion.

It is still another object of the present invention to provide a flame retardant polyester resin composition which is satisfactory in terms of mechanical strength and resin knead-processability and has no bleedout caused by annealing on the surface of a molded product.

Other objects and advantages of the present invention will become apparent from the following description.

According to the present invention, the above objects and advantages of the present invention can be attained by a flame retardant resin composition comprising:

(A) 100 parts by weight of a thermoplastic aromatic polyester resin, (B) 3 to 70 parts by weight of a novolak phenol resin, and (C) 1 to 15 parts by weight of coated red phosphorus powder having the coating film of a cured resin.

In the present invention, the thermoplastic aromatic polyester resin (A) is a polyester comprising an aromatic dicarboxylic acid as a main dicarboxylic acid component and an aliphatic diol having 2 to 10 carbon atoms as a main glycol component. The aromatic dicarboxylic acid component preferably accounts for 80 mol % or more, more preferably 90 mol % or more of the total of all dicarboxylic acid components, and the aliphatic diol having 2 to 10 carbon atoms preferably accounts for 80 mol % or more, more preferably 90 mol % or more of the total of all glycol components.

Preferred examples of the aromatic dicarboxylic acid include terephthalic acid, isophthalic acid, phthalic acid, methylterephthalic acid, methylisophthalic acid, 2,6-naphthalenedicarboxylic acid and the like. They may be used alone or in combination of two or more.

Subsidiary dicarboxylic acids other than aromatic dicarboxylic acids include, for example, aliphatic and alicyclic dicarboxylic acids such as adipic acid, sebacic acid, decanedicarboxylic acid, azelaic acid, dodecanedicarboxylic acid and cyclohexanedicarboxylic acid.

Illustrative examples of the aliphatic diol having 2 to 10 carbon atoms include aliphatic diols such as ethylene glycol, trimethylene glycol, tetramethylene glycol, hexamethylene glycol and neopentyl glycol and alicyclic diols such as 1,4-cyclohexane dimethanol. These aliphatic diols may be used alone or in combination of two or more. Subsidiary glycols other than aliphatic diols having 2 to 10 carbon atoms include, for example, p,p'-dihydroxyethoxy bisphenol A, polyoxyethylene glycol and the like.

The thermoplastic aromatic polyester resin (A) is preferably a polyester or polyester elastomer each having ester units comprising at least one dicarboxylic acid selected from the group consisting of terephthalic acid and 2,6-naphthalenedicarboxylic acid as a main dicarboxylic acid component and at least one diol selected from the group consisting of ethylene glycol and tetramethylene glycol as a main diol component.

Of these, the thermoplastic aromatic polyester resin (A) is more preferably either a polyester comprising tetramethylene terephthalate or tetramethylene-2,6-naphthalene dicarboxylate as a main recurring unit or a polyester elastomer comprising tetramethylene terephthalate or tetramethylene-2,6-naphthalene dicarboxylate as a main recurring unit of a hard segment.

The soft segment of the polyester elastomer comprising tetramethylene terephthalate or tetramethylene-2,6-naphthalene dicarboxylate as a main recurring unit of a hard segment is a polyester which comprises at least one dicarboxylic acid selected from the group consisting of terephthalic acid, isophthalic acid, sebacic acid and adipic acid and at least one diol selected from the group consisting of long-chain diols having 5 to 10 carbon atoms and $H(OCH_2CH_2)_iOH(i=2 \text{ to } 5)$ and which has a melting point of 100° C. or lower or is amorphous, or polycaprolactone.

The thermoplastic aromatic polyester resin of the present invention preferably has an intrinsic viscosity, measured at 35° C. in orthochlorophenol, of 0.5 to 1.4, more preferably 0.6 to 1.2. When the intrinsic viscosity is less than 0.5, the mechanical strength of the obtained composition lowers disadvantageously. On the other hand, when the intrinsic viscosity is more than 1.4, the obtained composition has reduced flowability disadvantageously.

The novolak phenol resin used in the present invention is obtained by polycondensing a phenol and formaldehyde in the presence of an acid catalyst. The weight average molecular weight of the novolak phenol resin is preferably 600 to 13,000, more preferably 650 to 7,000.

The amount of the novolak phenol resin added is 3 to 70 parts by weight based on 100 parts by weight of the thermoplastic aromatic polyester resin (A). When the amount is less than 3 parts by weight, the flame retardancy is not sufficient. On the other hand, when the amount is more than 70 parts by weight, the mechanical properties of the obtained molded product deteriorate. The amount is preferably 5 to 50 parts by weight.

Red phosphorus used in the present invention is used in the form of coated red phosphorus powder having the coating layer of a cured resin. Red phosphorus as it is is dangerous chemicals and may ignite due to a high temperature or mechanical shock or generate phosphine.

The cured resin used for the coating layer of the coated red phosphorus powder is preferably the cured product of at least one curable resin selected from the group consisting of phenol resins, epoxy resins, unsaturated polyester resins, melamine resins, urea resins, and aniline resins.

The coated red phosphorus powder can further contain an inorganic compound selected from the group consisting of aluminum hydroxide, magnesium hydroxide, zinc hydroxide and titanium hydroxide in the dispersed state in the coated cured resin, or the coating layer of an inorganic compound selected from the group consisting of aluminum hydroxide, magnesium hydroxide, zinc hydroxide and titanium hydroxide may be present, in contact with red phosphorus, underneath the coating film of the above cured resin.

The average particle diameter of the coated red phosphorus powder having the coating layer of a cured resin is preferably in the range of 5 to 40 pm, more preferably 25 to 35 pm.

The coated red phosphorus powder (C) is used in an amount of 1 to 15 parts by weight based on 100 parts by weight of the aromatic polyester resin (A). Below 1 part by weight, the flame retardancy is insufficient, while above 15 parts by weight, a molded product obtained from the flame retardant resin composition has reduced mechanical properties disadvantageously.

Although the coated red phosphorus powder is greatly improved in terms of safety in handling or the like as compared with red phosphorus by itself, it is desirable that a master pellet prepared by melting and kneading a thermoplastic resin with the coated red phosphorus powder in advance be used to ensure higher safety at the time of use. Use of this master pellet can further provide a resin composition which can produce a molded product having excellent mechanical strength.

In this case, the thermoplastic resin that can be used is not particularly limited. Illustrative examples of the thermoplastic resin include polyethylene, polypropylene, EPDM, ethylene ethyl acrylate, ethylene methyl acrylate, polyester, polyamide, polycarbonate and the like. A thermoplastic aromatic polyester resin which is used as the component (A) is generally preferred.

The content of the coated red phosphorus powder (C) contained in the master pellet is preferably 15 to 35 wt %, because below 15 wt %, the amount of the master pellet added increases relatively, while above 35 wt %, it is difficult to produce the master pellet and there exists the possibility of lowering of safety.

The thus obtained master pellet is added in an amount of 5 to 70 parts by weight based on 100 parts by weight of the aromatic polyester resin (A). Below 5 parts by weight, desired flame retardancy cannot be obtained, while above 70 parts by weight, the inherent characteristic properties of the polyester resin are lost.

The flame retardant resin composition of the present invention may further contain an inorganic filler as long as it does not impair the object of the present invention.

Illustrative examples of the inorganic filler include granular and amorphous fillers such as calcium carbonate, titanium oxide, feldspar minerals, clay, white carbon, carbon black and glass bead; plate-like fillers such as kaolin clay and talc; flake fillers such as glass flake, mica and graphite; and fibrous fillers such as glass fibers, wollastonite and potassium titanate.

The inorganic filler is preferably contained in an amount of 5 to 150 parts by weight based on 100 parts by weight of the aromatic polyester resin (A).

Further, the flame retardant resin composition of the present invention may contain a fluororesin. Illustrative examples of the fluororesin include polytetrafluoroethylene, tetrafluoroethylene/ethylene copolymers and the like. The amount of the fluororesin added is preferably 0.01 to 10 parts by weight based on 100 parts by weight of the aromatic polyester resin (A). The amount exceeding 10 parts by weight is not preferred in view of moldability. The combustion time of the resin composition can be shortened by adding a fluororesin.

Further, the flame retardant resin composition of the present invention may contain silicone powder. The silicone powder has such a structure that silane and silicone are carried by silica. The amount of the silicone powder added is preferably 0.01 to 10 parts by weight based on 100 parts by weight of the aromatic polyester resin (A). The amount exceeding 10 parts by weight is not preferred in view of moldability.

The flame retardant resin composition of the present invention may further contain commonly used additives, such as an antioxidant, a thermal stabilizer, an ultraviolet absorber, a lubricant, a nucleating agent, a plasticizer, a release agent, a pigment, and an impact modifier such as various elastomers.

As a process for producing the flame retardant resin composition of the present invention, there is one in which a polyester resin, coated red phosphorus powder or red phosphorus master pellet, a novolak phenol resin, glass fibers and the like are simultaneously molten and kneaded using an extruder. Some of these components may be molten and kneaded in advance.

The resin composition obtained by melting and kneading with an extruder is pelletized by a pelletizer, and molded by any molding methods such as injection molding or blow molding.

The flame retardant resin composition of the present invention is advantageously used for injection molded products such as electronic and electric parts for home electric appliances, office automation equipment and the like. More specifically, it can be used in switch parts, motor parts, ignition coil cases, coil bobbins, connectors, relay cases, fuse cases and the like.

The following examples are given to further illustrate the present invention. In the following examples, "parts" means "parts by weight". Intrinsic viscosity was measured at 35° C. in an orthochlorophenol solvent. Each test was evaluated in accordance with the following methods.

Flame retardancy:

Evaluated using a test piece having a thickness of 1/8 inch, 1/16 inch or 1/32 inch in accordance with the UL94V test method. Flame retardancy was classified into V-0, V-1, V-2 and HB in accordance with an evaluation method specified in UL94. In addition to the results of evaluation conducted by this evaluation method, data on dripping were also included. As for the effect of a fluororesin and silicone powder, an average combustion time for each test was described.

Oxygen index (O.I.):

Measured in accordance with JIS K7201

Flexural strength:

Measured in accordance with ASTM-D790

Deflection temperature under load:

Measured in accordance with ASTM-D648-56

Bleedout:

Evaluated as X when powdery or liquid bleedout was observed with naked eyes on the surface of a molded product after a test piece for combustion test was annealed at 150° C. for 72 hours, and ○ when no bleedout was observed.

Evaluation of knead-processability:

Evaluated as X when there was blocking under a hopper and ○ when there was no blocking.

EXAMPLES 1 TO 11 AND COMPARATIVE EXAMPLES 1 TO 11

The compositions of Examples 1 to 11 are shown in Table 1 and the compositions of Comparative Examples 1 to 11 are shown in Table 2. A red phosphorus master pellet prepared by melting and kneading 30 wt % of red phosphorus surface-coated with a phenol resin and 70 wt % of a polybutylene terephthalate resin was used. In these Examples and Comparative Examples, a twin-screw extruder (TEX44 of The Japan Steel Works, Ltd.) was used as an extruder, and melting and kneading were carried out at a cylinder temperature of 260° C. (Examples 1 to 9 and Comparative Examples 1 to 9), 230° C. (Example 10 and Comparative Example 10) and 270° C. (Example 11 and Comparative Example 11), a discharge of 40 kg/hr and a revolution of 150 rpm. Chips were obtained using a cutter. All Examples had stable extrusion moldability almost free from break in the thread.

The obtained chips were dried at 120° C. for 5 hours, and the melting temperature was set to 260° C. and the mold temperature was to 60° C. (Examples 1 to 9 and Comparative Examples 1 to 9), the melting temperature was set to 230° C. and the mold temperature to 80° C. (Example 10 and Comparative Example 10), and the melting temperature was set to 270° C. and the mold temperature to 80° C. (Example 11 and Comparative Example 11) to form test pieces for a combustion test, test pieces for a tensile test and test pieces for a flexural test.

The results of the combustion test (UL94V glass non-reinforced pieces were 1/8 and 1/16 inch and glass reinforced pieces were 1/8, 1/16 and 1/32 inch, and oxygen index), tensile test, flexural test, deflection-temperature-under-load test and bleedout test by annealing, which were carried out using these test pieces, and the results of knead-processability are shown in Tables 3, 4 and 5.

Coated red phosphorus having a coated surface was produced by the following procedure: Red phosphorus was first suspended in water, and an aqueous solution of aluminum sulfate was added. Then, aqueous solution of sodium hydroxide was added dropwise thereto under thorough stirring, and the mixture was heated at 50° C. for 30 minutes. Thereafter, phenol and formalin were added to the mixture, which was then heated to 80° C. Phosphoric acid was added to the resulting mixture under stirring, and it was further heated and stirred at the same temperature for 1 hour. The resulting product was left to cool, filtered, washed with water, and then dried.

TABLE 1

| Composition | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| PBT | 100 | 100 | 100 | 100 | 100 | 100 | 100 | 100 | 100 | | |
| PBT elastomer | | | | | | | | | | 100 | |
| PET | | | | | | | | | | | 100 |
| glass fibers | | | 60 | 60 | 60 | 60 | 60 | 60 | | | 60 |
| coated red phosphorus powder | | | | | | | | | 3 | | |
| red phosphorus master pellet | 13 | 20 | 10 | 20 | 20 | 65 | 20 | 20 | | 13 | 20 |
| phenol resin | 20 | 20 | 10 | 20 | 40 | 20 | 20 | 20 | 20 | 20 | 20 |
| Fluororesin | | | | | | | 1 | | | | |
| silicone powder | | | | | | | | 2 | | | |

Ex.: Example
PBT: polytetramethylene terephthalate (intrinsic viscosity of 1.07) of Teijin Limited
PBT elastomer: polyester-polyester elastomer (intrinsic viscosity of 1.03), NOUVERAN Q4110AN of Teijin Limited

TABLE 1-continued

| Composition | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|

PET: polyethylene terephthalate (intrinsic viscosity of 0.83) of Teijin-Limited
glass fibers: T124 of Asahi Glass Co., Ltd.
coated red phosphorus powder: red phosphorus whose surface is coated with a phenol resin and aluminum hydroxide, NOVA EXCEL 140 of Rin Kagaku K.K.
red phosphorus master pellet: red phosphorus whose surface is coated with a phenol resin and aluminum hydroxide, NOVA EXCEL 140 of Rin Kagaku Kogyo Co., Ltd., and thermoplastic-resin: polybutylene terephthalate (intrinsic viscosity of 0.87) of Teijin Limited
phenol resin: novolak phenol resin, PR-53195 of Sumitomo Durez, Co., Ltd.
fluororesin; polytetrafluoroethylene, FA100 of Daikin Industries, Ltd.
silicone powder: DC4-7105 of Toray Dow Corning Silicone Co., Ltd.

TABLE 2

| composition | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 | C. Ex. 10 | C. Ex. 11 |
|---|---|---|---|---|---|---|---|---|---|---|---|
| PBT | 100 | 100 | 100 | 100 | 100 | 100 | 100 | 100 | 100 | | |
| PBT elastomer | | | | | | | | | | 100 | |
| PET | | | | | | | | | | | 100 |
| glass fibers | | | | | | 60 | 60 | 60 | 60 | | 60 |
| red phosphorus master pellet | 2 | 13 | | 13 | 13 | 20 | 60 | | | | |
| phosphate | | | 20 | | | | | 20 | 20 | 20 | 20 |
| phenol resin | 2 | 2 | 20 | | | | | 20 | 20 | 20 | 20 |
| melamine cyanurate | | | | 20 | | | | | | | |
| diallyl phthalate | | | | | 20 | | | | | | |
| epoxy compound | | | | | | | | | 1 | | |

C. Ex.: Comparative Example
phosphate: PX201 of Daihachi Chemical Industry Co., Ltd.
iron oxide: $Fe_3O_4$, first-grade reagent of Wako Pure Chemical Industries, Ltd.
melamine cyanurate: MC490 of Nissan Chemical Industries, Ltd.
diallyl phthalate: DAP-K of Daiso Co., Ltd.
epoxy compound: EPICOTE 815 of Yuka Shell Epoxy Co., Ltd.

TABLE 3

| Properties | Ex. 1 | Ex. 2 | Ex. 3 | Ex. 4 | Ex. 5 | Ex. 6 | Ex. 9 | Ex. 10 | Ex. 11 |
|---|---|---|---|---|---|---|---|---|---|
| ⅛-inch UL94 flame-retardancy | V-0 | V-0 | V-0 | V-0 | V-0 | V-0 | V-0 | V-0 | V-0 |
| dripping | 0/10 | 0/10 | 0/10 | 0/10 | 0/10 | 0/10 | 0/10 | 0/10 | 0/10 |
| 1/16-inch UL94 flame-retardancy | V-0 | V-0 | V-0 | V-0 | V-0 | V-0 | V-0 | V-0 | V-0 |
| dripping | 0/10 | 0/10 | 0/10 | 0/10 | 0/10 | 0/10 | 0/10 | 0/10 | 0/10 |
| 1/32-inch UL94 flame-retardancy | — | — | V-0 | V-0 | V-0 | V-0 | V-0 | — | V-0 |
| dripping | — | — | 0/10 | 0/10 | 0/10 | 0/10 | 0/10 | — | 0/10 |
| oxygen index (%) | 32 | 32 | 35 | 38 | 37 | 39 | 38 | 33 | 38 |
| flexural strength (MPa) | 105 | 105 | 205 | 200 | 211 | 195 | 101 | — | 215 |
| deflection temperature under load (1.82 MPa) | 70 | 71 | 220 | 214 | 211 | 204 | 69 | — | 233 |
| bleedout at the time of annealing | ○ | ○ | ○ | ○ | ○ | ○ | ○ | ○ | ○ |
| blocking at the time of knead-processing | ○ | ○ | ○ | ○ | ○ | ○ | ○ | ○ | ○ |

Ex.: Example

TABLE 4

| Properties | Ex. 4 | Ex. 7 | Ex. 8 |
|---|---|---|---|
| ⅛-inch UL94 flame-retardancy | V-0 | V-0 | V-0 |
| average combustion time (min) | 3.4 | 2.9 | 3.0 |
| dripping | 0/10 | 0/10 | 0/10 |
| 1/16-inch UL94 flame-retardancy | V-0 | V-0 | V-0 |
| average combustion time (min) | 4.4 | 4.0 | 4.0 |
| dripping | 0/10 | 0/10 | 0/10 |
| 1/32-inch UL94 flame-retardancy | V-0 | V-0 | V-0 |
| average combustion time (min) | 4.9 | 4.3 | 4.5 |
| dripping | 0/10 | 0/10 | 0/10 |
| oxygen index (%) | 38 | 37 | 38 |

Ex.: Example

TABLE 5

| Properties | C. Ex. 1 | C. Ex. 2 | C. Ex. 3 | C. Ex. 4 | C. Ex. 5 | C. Ex. 6 | C. Ex. 7 | C. Ex. 8 | C. Ex. 9 | C. Ex. 10 | C. Ex. 11 |
|---|---|---|---|---|---|---|---|---|---|---|---|
| 1/8-inch UL94 flame-retardancy | V-2 | HB | V-0 | V-2 | HB | HB | HB | V-0 | V-0 | V-0 | V-0 |
| dripping | 10/10 | 7/10 | 0/10 | 10/10 | 5/10 | 3/10 | 3/10 | 0/10 | 0/10 | 0/10 | 0/10 |
| 1/16-inch UL94 flame-retardancy | HB | V-2 | V-2 | V-2 | V-2 | HB | V-2 | V-1 | V-2 | V-2 | V-1 |
| dripping | 10/10 | 10/10 | 5/10 | 10/10 | 10/10 | 10/10 | 7/10 | 0/10 | 2/10 | 6/10 | 0/10 |
| 1/32-inch UL94 flame-retardancy | — | — | — | — | V-2 | V-2 | V-2 | — | — | — | — |
| dripping | — | — | — | — | 10/10 | 10/10 | 10/10 | — | — | — | — |
| oxygen index (%) | 23 | 24 | 28 | 21 | 22 | 25 | 25 | 32 | 29 | 27 | 33 |
| flexural strength (MPa) | 82 | 80 | 84 | 93 | 87 | 203 | 205 | 129 | 132 | — | 145 |
| deflection temperature under load (1.82 MPa) | 58 | 60 | 61 | 64 | 63 | 213 | 212 | 165 | 132 | — | 181 |
| bleedout at the time of annealing | ○ | ○ | X | ○ | X | ○ | ○ | X | X | X | X |
| blocking at the time of knead-processing | ○ | ○ | X | ○ | X | ○ | ○ | X | X | X | X |

C. Ex.: Comparative Example

A flame retardant resin composition in Example 1 was a blend comprising 13 parts by weight of a red phosphorus master pellet (to be referred to as "red phosphorus master" hereinafter) and 20 parts by weight of an uncured phenol resin (to be simply referred to as "phenol resin" hereinafter) based on 100 parts by weight of a PBT resin, and a flame retardant resin composition in Example 2 was a blend comprising 20 parts by weight of a red phosphorus master and 20 parts by weight of a phenol resin based on 100 parts by weight of a PBT resin. Both compositions showed V-0 in a UL-94 combustion test and excellent mechanical properties and no bleedout.

On the other hand, a flame retardant resin composition in Comparative Example 1 was a blend comprising 2 parts by weight of a red phosphorus master and 2 parts by weight of a phenol resin based on 100 parts by weight of a PBT resin. Since the amounts of the red phosphorus master and the phenol resin to be blended were inappropriate, sufficient flame retardancy was not obtained. A flame retardant resin composition in Comparative Example 2 comprised 13 parts by weight of a red phosphorus master and 2 parts by weight of a phenol resin based on 100 parts by weight of a PBT resin. Since the amount of the phenol resin was inappropriate, sufficient flame retardancy was not obtained.

In a flame retardant resin composition in Comparative Example 3, there were used 20 parts by weight of a phosphate, as a phosphorus-based flame retardant in place of the red phosphorus master, and 20 parts by weight of a phenol resin based on 100 parts by weight of a PBT resin. V-0 flame retardancy was obtained for 1/8 inch, whereas sufficient flame retardancy was not obtained for 1/16 inch. When a phosphate was used, bleedout at the time of annealing was prominent and white powder was adhered to the surface of a molded product.

In a flame retardant resin composition in Comparative Example 4, there were blende 13 parts by weight of a red phosphorus master and 20 parts by weight of melamine cyanurate as a substitute for the phenol resin based on 100 parts by weight of a PBT resin. When melamine cyanurate was used, a problem of no dripping was not solved and sufficient flame retardancy was not obtained for both 1/8 inch and 1/16 inch.

In a flame retardant resin composition in Comparative Example 5, there were blended 13 parts by weight of a red phosphorus master and 20 parts by weight of diallyl phthalate as a substitute for the phenol resin based on 100 parts by weight of a PBT resin, but it showed no flame retardant effect. It was confirmed from the results of the above Examples 1 and 2 and Comparative Examples 3 to 5 that especially high flame retardancy can be obtained only when a red phosphorus master and a phenol resin are used in specific amounts.

A flame retardant resin composition in Example 3 was a blend comprising 60 parts by weight of glass fibers, 10 parts by weight of a red phosphorus master and 10 parts by weight of a phenol resin based on 100 parts by weight of a PBT resin. V-0 flame retardancy of this resin composition was obtained for up to a thickness of 1/32 inch. The resin composition had high mechanical properties and effective blocking resistance and had no bleed-out.

Similarly, a flame retardant resin composition in Example 4 was a blend comprising 60 parts by weight of glass fibers, 20 parts by weight of a red phosphorus master and 20 parts by weight of a phenol resin based on 100 parts by weight of a PBT resin. This resin composition had as high flame retardancy, excellent bleed-out resistance and blocking resistance as that of Example 3. A flame retardant resin composition in Example 5 was a blend comprising 60 parts by weight of glass fibers, 20 parts by weight of a red phosphorus master and 40 parts by weight of a phenol resin based on 100 parts by weight of a PBT resin. The resin composition had as high flame retardancy, excellent bleed-out resistance and blocking resistance as those of Examples 3 and 4.

A flame retardant resin composition in Example 6 was a blend comprising 60 parts by weight of glass fibers, 65 parts by weight of a red phosphorus master and 20 parts by weight of a phenol resin based on 100 parts by weight of a PBT resin. The same results as those of Examples 3, 4 and 5 were obtained in this resin composition.

On the other hand, in a flame retardant resin composition in Comparative Example 6 comprised 60 parts by weight of glass fibers and 20 parts by weight of a red phosphorus master were blended with 100 parts by weight of a PBT resin, but no phenol resin was contained. As a result, it had low flame retardancy. In a flame retardant resin composition in Comparative Example 7, a red phosphorus master whose amount was increased up to 60 parts by weight was blended with 60 parts by weight of glass fibers and 100 parts by weight of a PBT resin. The resin composition had low flame retardancy similar to Comparative Example 6, and hence, it was found that a thermosetting phenol resin used as a coating agent to enhance the safety of red phosphorus does not provide sufficient flame retardancy to a PBT resin and that a V-0 flame retardant effect can be exhibited only by adding an uncurable phenol resin at the time of extrusion and kneading.

In a flame retardant resin composition in Comparative Example 8, 60 parts by weight of glass fibers and 100 parts by weight of a PBT resin were blended with 20 parts by weight of a phosphate as a substitute for the red phosphorus master and 20 parts by weight of a phenol resin. However, sufficient flame retardancy was not obtained, bleed-out was seen on the surface of a molded product after annealing, and blocking occurred at an upper portion of a raw material introduction port of the screw at the time of extrusion.

In a flame retardant resin composition in Comparative Example 9, 1 part by weight of an epoxy compound was further added to the composition of Comparative Example 8, that is, 100 parts by weight of a PBT resin, 60 parts by weight of glass fibers, 20 parts by weight of a phosphate, and 20 parts by weight of a phenol resin. However, bleed-out could not be suppressed.

A flame retardant resin composition in Example 9 was a blend comprising 60 parts by weight of glass fibers, 3 parts by weight of red phosphorus powder and 20 parts by weight of a phenol resin based on 100 parts by weight of a PBT resin. It was satisfactory in terms of flame retardancy, bleed-out resistance and blocking resistance, as was a master pellet. However, the red phosphorus powder as it is is treated as an object of dangerous material, and it is feared that they may be ignited by an impact.

A flame retardant resin composition in Example 10 was a blend comprising 13 parts by weight of a red phosphorus master and 20 parts by weight of a phenol resin based on 100 parts by weight of a polyester elastomer. It was satisfactory in terms of flame retardancy, bleed-out resistance and blocking resistance.

On the other hand, a flame retardant resin composition in Comparative Example 10 was a blend comprising 20 parts by weight of a phosphate and 20 parts by weight of a phenol resin based on 100 parts by weight of a polyester elastomer. It showed, however, insufficient flame retardancy and poor bleed-out resistance and blocking resistance when the thickness was reduced.

A flame retardant resin composition in Example 11 was a blend comprising 60 parts by weight of glass fibers, 20 parts by weight of a red phosphorus master and 20 parts by weight of a phenol resin based on 100 parts by weight of a PET resin. On the other hand, a flame retardant resin composition in Comparative Example 11 was a blend comprising 60 parts by weight of glass fibers, 20 parts by weight of a phosphate and 20 parts by weight of a phenol resin based on 100 parts by weight of PET fibers. The resin composition in Example 11 showed high V-0 flame retardancy was obtained for up to 1/32 inch and was satisfactory in terms of mechanical properties, bleed-out resistance and blocking resistance. On the other hand, the flame retardancy of the resin composition of Comparative Example 11 lowered as the thickness decreased and the resin composition of Comparative Example 11 was inferior to that of Example 11 in mechanical properties, bleed-out resistance and blocking resistance.

A flame retardant resin composition in Example 7 was a blend comprising 60 parts by weight of glass fibers, 20 parts by weight of a red phosphorus master, 20 parts by weight of a phenol resin and additionally 1 part by weight of a fluororesin based on 100 parts by weight of a PBT resin. It was confirmed that the resin composition of Example 7 was improved in terms of flame retardancy because of its shorter combustion time than that of Example 4.

A flame retardant resin composition in Example 8 comprised 60 parts by weight of glass fibers, 20 parts by weight of a red phosphorus master, 20 parts by weight of a phenol resin and further 2 parts by weight of silicone powder based on 100 parts by weight of a PBT resin. It was confirmed that the resin composition of Example 8 was improved in terms of flame retardancy because of its shorter combustion time than that of Example 4.

The flame retardant resin composition of the present invention is a non-halogen flame retardant resin composition. While it was difficult to improve particularly the flame retardancy of polytetramethylene terephthalate by red phosphorus powder alone, such effects that dripping at the time of combustion is suppressed and the combustion time is drastically shortened can be achieved by using coated red phosphorus powder or a master pellet containing red phosphorus having a coated surface and a novolak phenol resin. It is a characteristic feature that flame retardancy can be especially improved by using a novolak phenol resin in conjunction with red phosphorus, and a favorable result cannot be obtained by nitrogen-containing melamine cyanurate which has been frequently used as an aid or thermosetting diallyl phthalate. The flame retardant resin composition of the present invention shows high flame retardancy with a small amount of a flame retardant, is satisfactory in terms of mechanical properties and resin knead-processability, and is free from bleed-out on the surface of a molded product by annealing which occurs when a phosphate is used. Therefore, it is of extremely great industrial value.

We claim:

1. A flame retardant resin composition comprising:
   (A) 100 parts by weight of a thermoplastic aromatic polyester resin,
   (B) 3 to 70 parts by weight of a novolak phenol resin, and
   (C) 1 to 15 parts by weight of coated red phosphorus powder having a coating layer of a cured resin,
   wherein the novolak phenol resin (B) has a weight average molecular weight of 600 to 13,000.

2. The composition of claim 1, wherein the thermoplastic aromatic polyester resin (A) is a polyester or polyester elastomer consisting of ester units, in which a main dicarboxylic acid component is at least one dicarboxylic acid selected from the group consisting of terephthalic acid and 2,6-naphthalenedicarboxylic acid and a main diol component is at least one diol selected from the group consisting of ethylene glycol and tetramethylene glycol.

3. The composition of claim 2, wherein the thermoplastic aromatic polyester resin (A) is either a polyester comprising tetramethylene terephthalate or tetramethylene-2,6-naphthalene dicarboxylate as a main recurring unit or a polyester elastomer comprising tetramethylene terephthalate or tetramethylene-2,6-naphthalene dicarboxylate as a main recurring unit of a hard segment.

4. The composition of claim 1, wherein the cured resin of the coating layer of the coated red phosphorus powder is at least one curable resin selected from the group consisting of phenol resins, epoxy resins, unsaturated polyester resins, melamine resins, urea resins and aniline resins.

5. The composition of claim 1, wherein an inorganic compound selected from the group consisting of aluminum hydroxide, magnesium hydroxide, zinc hydroxide and titanium hydroxide is contained dispersedly in the cured resin of the coating layer of the coated red phosphorus powder.

6. The composition of claim 1, wherein a coating layer of an inorganic compound selected from the group consisting of aluminum hydroxide, magnesium hydroxide, zinc hydroxide and titanium hydroxide is further present, in contact with red phosphorus, underneath the coating layer of the cured resin.

7. The composition of claim 1, wherein the coated red phosphorus powder having the coating layer of the cured resin have an average particle diameter of 5 to 40 µm.

8. The composition of claim 1 which further contains 5 to 150 parts by weight of an inorganic filler.

9. The composition of claim 1, which further contains 0.01 to 10 parts by weight of a fluororesin.

* * * * *